2 Sheets--Sheet 1.
W. LEE & J. A. KLEY.
Hook and Ladder-Trucks.
No. 152,851. Patented July 7, 1874.
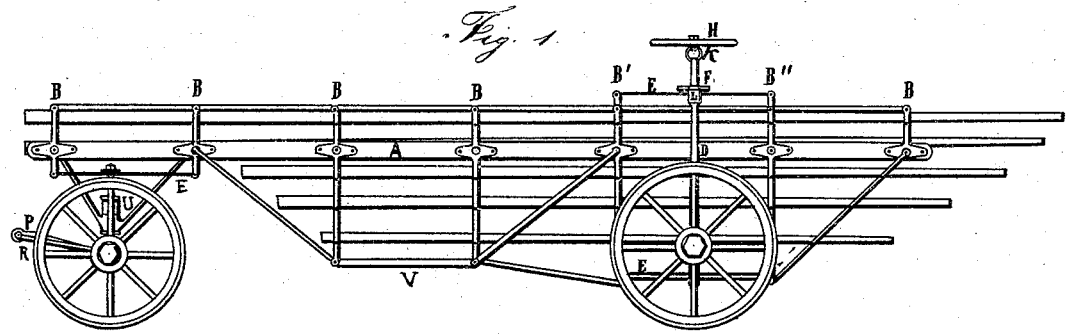
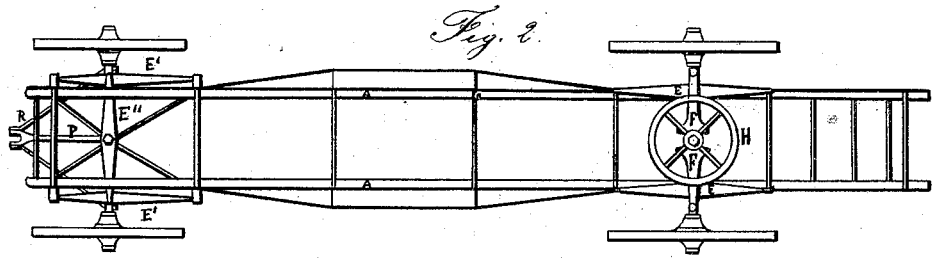
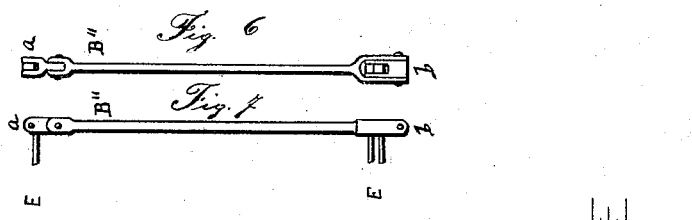
Witness.  Inventors.
E. A. West.  Wellington Lee
O. W. Bond.  John A. Kley

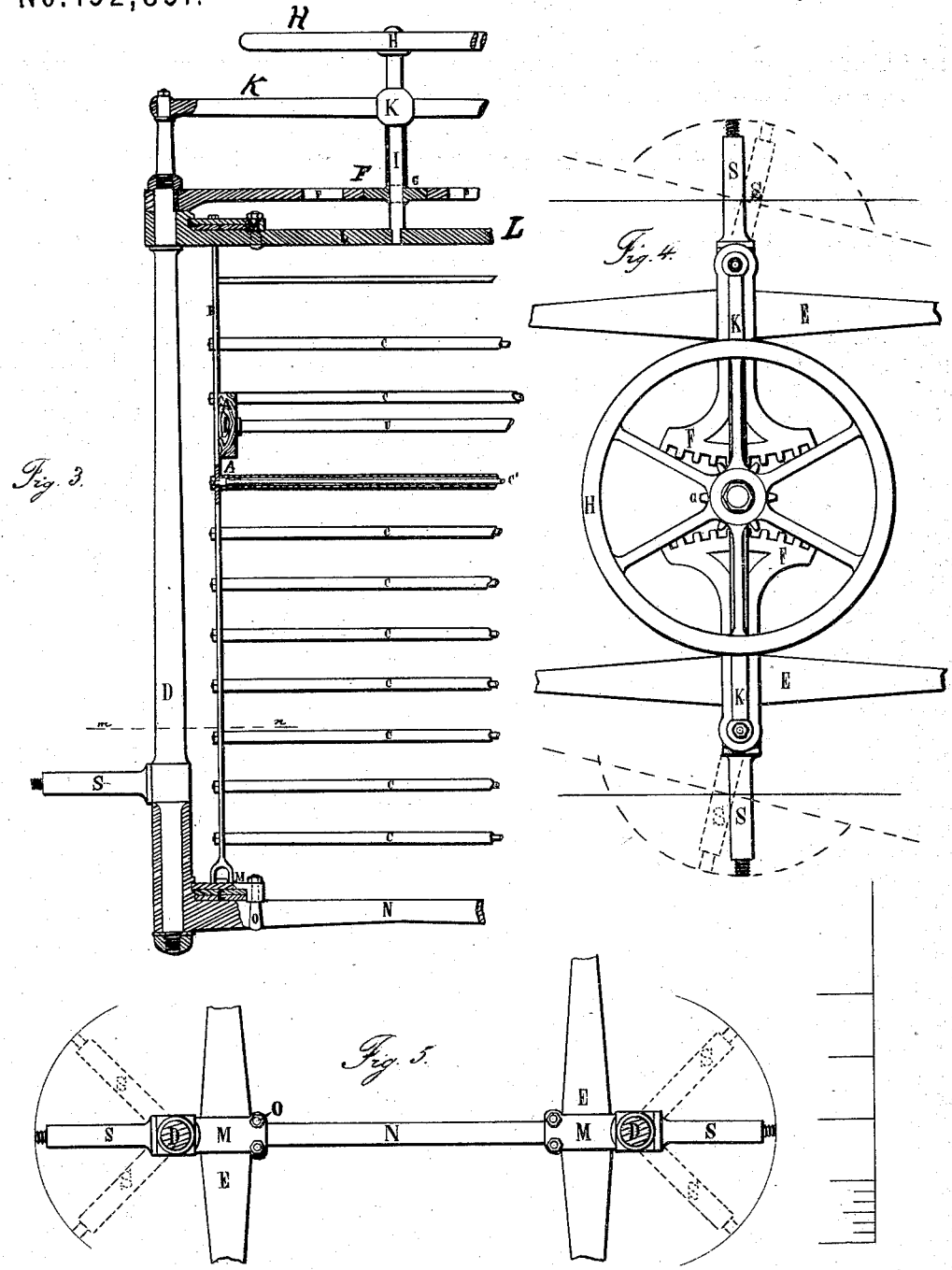

UNITED STATES PATENT OFFICE.

WELLINGTON LEE, OF NEW YORK, N. Y., AND JOHN A. KLEY, OF CHICAGO, ILLINOIS, ASSIGNORS TO THE BABCOCK MANUFACTURING COMPANY.

IMPROVEMENT IN HOOK-AND-LADDER TRUCKS.

Specification forming part of Letters Patent No. 152,851, dated July 7, 1874; application filed March 14, 1874.

*To all whom it may concern:*

Be it known that we, WELLINGTON LEE, of the city of New York, in the county and State of New York, and JOHN A. KLEY, of the city of Chicago, in the county of Cook and State of Illinois, have invented new and useful Improvements in Hook-and-Ladder Trucks, of which the following is a full description, reference being had to the accompanying drawings, consisting of two sheets, in which—

Figure 1 is a side elevation with the ladders in place; Fig. 2, a plan view with the ladders removed; Fig. 3, a transverse vertical section with one side broken off; Fig. 4, a plan view of the steering apparatus; Fig. 5, a cross-section on line $m\ m$ of Fig. 3, showing the movement of the rear wheels; and Figs. 6 and 7, side and rear views of the standard B″, showing the mode of hinging the outer ends of the springs.

Heretofore hook-and-ladder trucks have been made with straight axles, and the ladders carried entirely above such axles, which makes them very high and renders them liable to get out of order; and the steering apparatus has been so made that it was necessary to withdraw the steering-wheel and its shaft, in order either to insert or draw out a ladder. The object of our invention is to overcome these difficulties; and its nature consists in attaching the rear wheels to revolving shafts placed outside of the ladder-frame, so that said frame may be brought down nearer the ground, and in arranging the steering apparatus above the ladder-frame, so that the ladders are free to be moved without disconnecting such steering apparatus; and in the several devices and combinations hereinafter claimed.

In the drawing, A represents the main frame; B, the side bars or standards for the forward part of the truck; B′ B″, side bars or standards for the rear part of the truck; C, rollers on the cross-rods; C′, cross-rods; D, revolving standards for the rear axles; E, springs; F, levers with segments at their inner ends; G, toothed wheel for operating the segments; H, hand-wheel; I, shaft of the hand-wheel, operated by the wheel G; K, cross-bar, with upper bearing of the shaft I; L, cross-bar, with lower bearing for the shaft I, and upper bearings for the shafts D; M, sockets for securing the springs E; N, cross-bar, with lower bearings for the shafts D; O, clamp-bolt for securing the sockets M; S, axles for the rear wheels; U, standard or cylinder for the king-bolt; and V, steps or platforms for mounting the truck, or carrying the men. The frame A is usually made of wood, and supplemented by an iron frame, B, which extends both above and below the frame A, as shown in Fig. 1. The standards B are connected by cross-rods C′, which cross-rods run through sections of gas-pipe C, which form rollers on said cross-rods, upon which the ladders are placed. These standards or side bars B can, with safety, be carried down to within sixteen or eighteen inches of the ground, so that the required number of short ladders can be carried below the frame A, while the long ladders are placed above, so they can be run farther forward, so as to balance them properly upon the truck. By this arrangement the regulation number of ladders can be carried on a low truck, as shown. The springs E are placed above and below the carrying-rods C, as shown, and they may be single or double, as desired. These springs are made tapering, according to the leverage, and are held in position by the sockets M, which are made to fit their angles and clamp them so as to hold them in place, and enable them to resist any thrust without weakening them, by making notches in them, or holes through them. The shafts D, which carry the axles S, to which the rear wheels are attached, are journaled at their lower ends in the cross-bar N, which is provided with suitable bearings for that purpose, and are journaled at their upper ends in the cross-bar L. Above this cross-bar there is attached to each shaft D a lever, F, which is provided at its inner end with a toothed segment fitted to engage in the toothed wheel G, so that the direction of the wheels can be readily changed for passing teams or turning corners. This wheel G is operated by the hand-wheel H, which is journaled at its lower end in the upper cross-bar L, so that it does not pass through the ladder-frame, or interfere with the introduction or withdrawal of the ladders. In order to hold the ladders in place, one of the rungs of each ladder is made to correspond in position with the rods of some one of the standards B, and an iron fork of sufficient length and strength is placed over them. By withdrawing this fork the ladders are all free to be moved. The rear ends of the springs E are attached to pivoted brackets. The bracket $a$ is pivoted in the upper end, and $b$ in a fork at the lower end, as shown at Figs. 6 and 7. The springs may be so attached at the front end, if desired; but one end will be sufficient, as a slight movement of the axle will compensate the difference, and, as the weight hangs from the front end of the springs, the brackets $a$ $b$ have an easy movement, and readily accommodate themselves to any shortening of the springs in their movements. The front end of the main frame is carried on three similar springs. The main spring E'' is permanently attached to the king-bolt post, and at each end of this spring a cross-spring, E', is placed, which is long enough to reach from B to B. One end of each of these springs is also provided with a pivoted bracket, like $a$ or $b$.

What we claim as new is as follows:

1. The vertical shaft D, having axle S, in combination with segments F, wheel G, and hand-wheel H, substantially as and for the purpose specified.

2. The combination of the cross-bars L, N, and K, and shaft D, with the wheels H and G, shaft I, and segments F, substantially as described.

3. The springs E and hinged links $a$ $b$, in combination with the connections B' B'' and frame A, substantially as and for the purpose set forth.

4. The combination of the springs E and sockets M with the side bars B' B'' and cross-bars L and N, substantially as specified.

5. The combination of the frame A with the side bars B and cross-rods $c$, partly above and partly below said frame A, substantially as and for the purposes specified.

6. The combination of the springs E' E'' with the king-bolt post U and frame $a$, substantially as and for the purposes specified.

WELLINGTON LEE.
JOHN A. KLEY.

Witnesses:
E. A. WEST,
O. W. BOND.